Aug. 3, 1943.    L. W. WHITMER    2,325,822
TRUCK FOR TRAILER VEHICLES
Filed May 28, 1941    2 Sheets-Sheet 1

Inventor
LEWIS W. WHITMER
By W. S. McDowell
Attorney

Inventor
LEWIS W. WHITMER

Patented Aug. 3, 1943

2,325,822

UNITED STATES PATENT OFFICE 2,325,822

TRUCK FOR TRAILER VEHICLES

Lewis W. Whitmer, Columbus, Ohio

Application May 28, 1941, Serial No. 395,637

2 Claims. (Cl. 280—33.4)

This invention relates to draft trucks for trailer vehicles, having for its object the provision of an improved wheeled truck for supporting and uniting the front end of a drawn trailer vehicle to or in connection with the rear axle construction of an automotive draft vehicle.

The so-called hitch connections now generally used for coupling trailer vehicles to automobiles are in several respects unsatisfactory or objectionable. For instance, such couplings or hitches are readily broken and are apt to become accidentally disengaged. Moreover, they do not provide adequate support for the unwheeled forward end of the usual trailer vehicle, nor compensate for lateral twisting movements of the two vehicles with respect to each other, particularly when the vehicles are being operated over rough or uneven road surfaces, and, furthermore, it is difficult and often impossible to impart controlled rearward or backward movement to the joined vehicles, as when parking or maneuvering for short turns.

To overcome these well recognized objections in standard trailer hitches, the present invention provides a small, lightweight truck, the frame construction of which includes a pair of rearwardly converging draft bars, having their forward ends adapted to be detachably connected with supports carried in connection with the rear axle construction of the automotive vehicle, while the rear ends of the bars are joined with a bolster upon which the forward end of the trailer vehicle has a detachable swivel connection, said bolster carrying a horizontally disposed pivot member on which is centrally fulcrumed, for swinging movement in a transverse direction, an axle beam, the latter at its ends supporting road-engaging caster wheels, the structural organization of these parts being such as to provide an improved wheeled support for the forward end of the trailer vehicle, a support which compensates for relative movement between the vehicles because of road unevenness, and a support which provides an efficient draft action in both forward and rearward movements of the coupled vehicles.

For a further understanding of the invention, reference is to be had to the following description and the accompanying drawings, in which.

Figure 1:
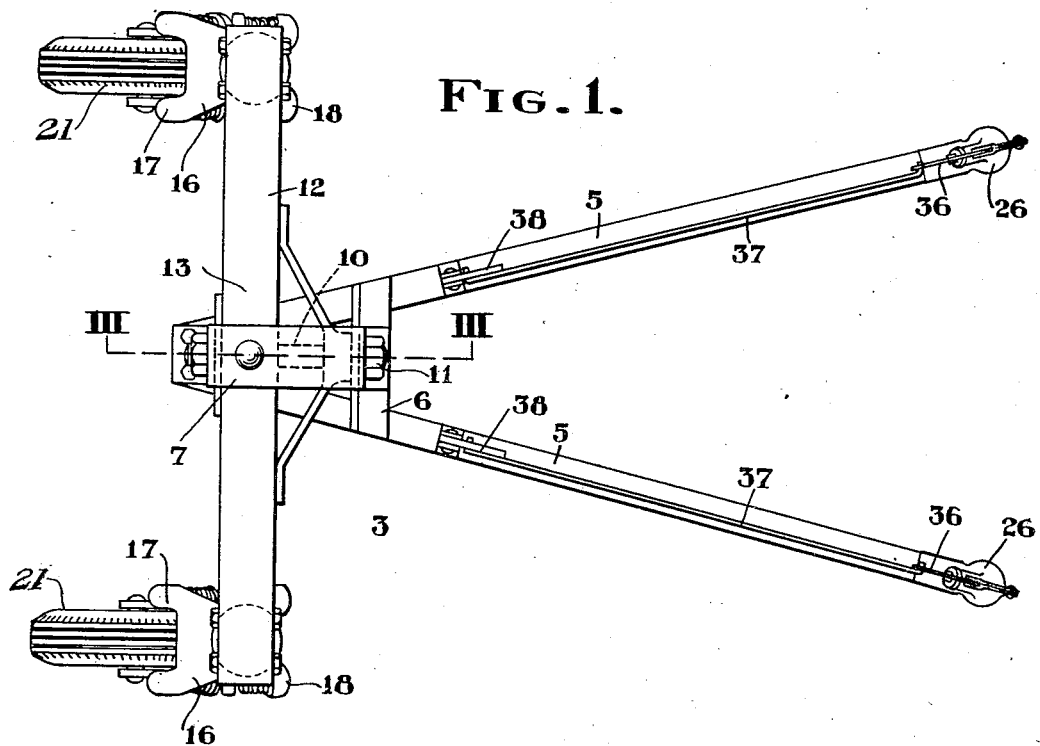
Fig. 1 is a plan view of the combined trailer truck and hitch forming the present invention.
Figure 2:
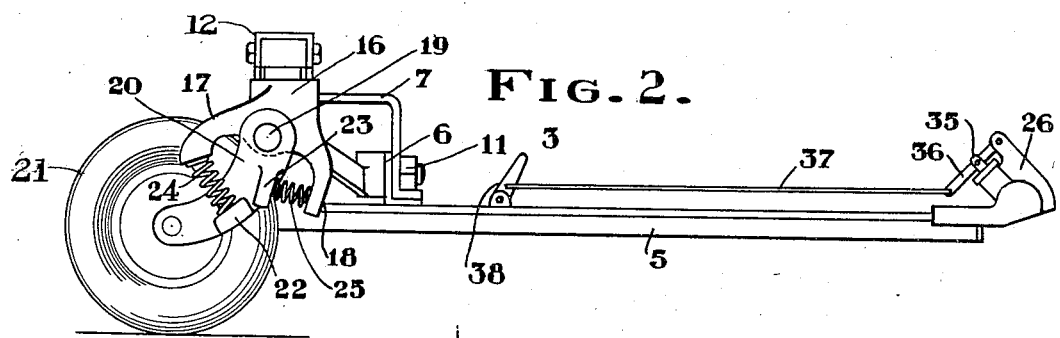
Fig. 2 is a side elevational view thereof.
Figure 3:
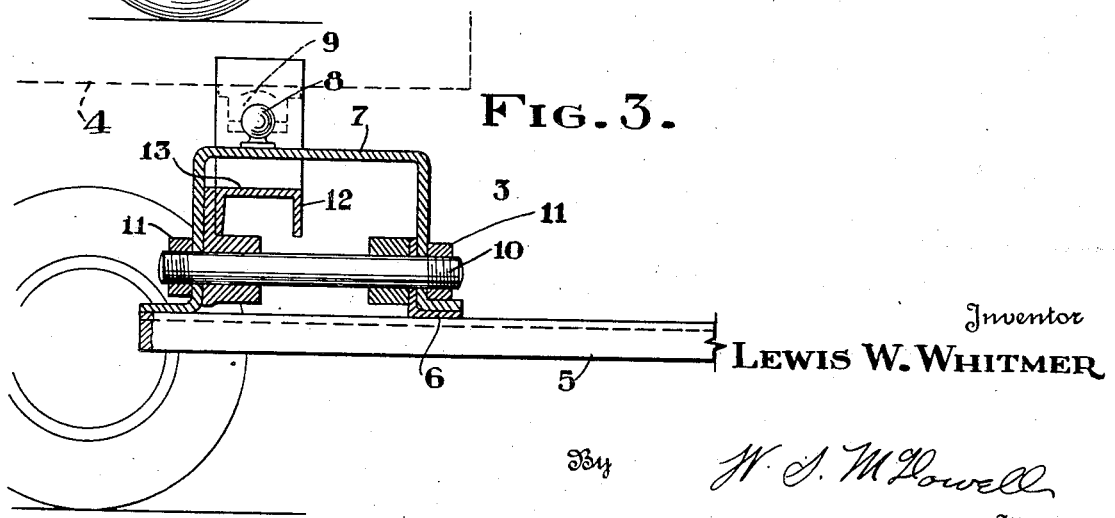
Fig. 3 is a detail vertical sectional view on the plane indicated by the line III—III of Fig. 1.

Referring more particularly to the drawings, and the single embodiment of the invention therein illustrated, the numeral 1 designates the rear axle construction of an automotive vehicle 2. Connected with the axle construction 1 is the improved truck 3, constituting the present invention, this truck being employed as a draft vehicle for uniting the automotive vehicle 2 with the trailer vehicle, the forward portion of which is shown at 4.

The truck 3 comprises a pair of horizontally disposed, rearwardly converging, draft bars 5, the rear ends of the latter being united by transversely extending bars 6. Rigidly mounted on the rear ends of the bars 5 is a bolster bracket 7, and mounted on the upper portion of the bracket 7 is a rigid ball member 8, the latter being adapted to be received within a socket member 9 carried in connection with the forward end of the trailer vehicle 4. Mounted in connection with the bars 6 and the bolster bracket 7 is a longitudinally extending, horizontally disposed pivot pin 10, the ends of said pin being threaded for the reception of binding nuts 11. Carried for swinging movement in a transverse plane by the pivot pin 10 is an axle beam 12. This beam is formed with a depressed central region 13, through which the pin 10 passes, while the outer ends of the beam are comparatively elevated with respect to the lowered or depressed central portion.

Figure 4:
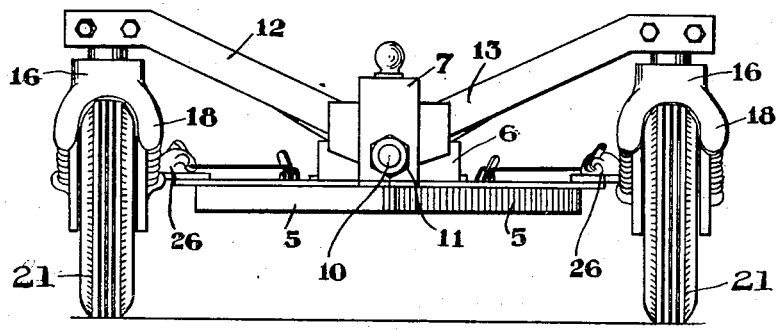
Fig. 4 is a front elevational view of the truck.
Figure 5:
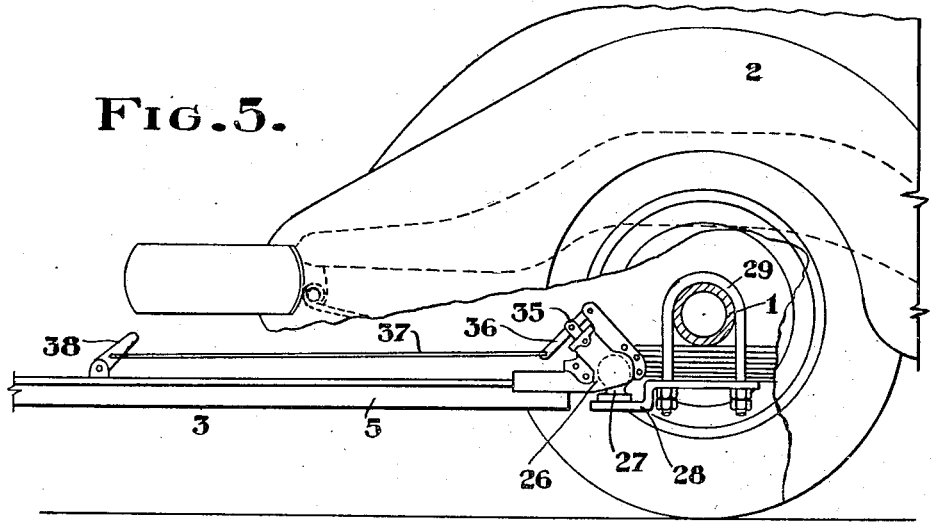
Fig. 5 is a fragmentary side elevational view of the forward portion of the truck and disclosing the means for detachably connecting the same with the rear axle construction of an associated automotive vehicle.
Figures 6, 7:
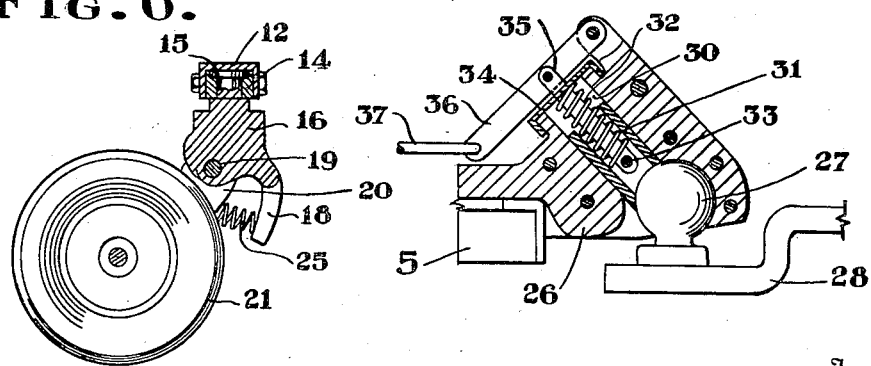
Fig. 6 is a vertical sectional view showing one of the caster wheels of the truck.
Fig. 7 is an enlarged detail view, partly in vertical section, of the ball and socket connection between the truck and the automotive vehicle.

As shown in Figs. 4 and 6, the beam 12 at each of its outer ends is provided with a socket 14 in which is swiveled a vertically disposed stud axle 15. Formed with and depending from each axle 15 is a bifurcated body 16, having spaced sets of arms shown at 17 and 18. Pivoted as at 19 to each body 16 is an arcuate caster yoke, each of the latter carrying a rubber tired caster wheel 21. It will be noted that each of the wheels 21 may turn about the vertical axis provided by the stud 15 and also the horizontal axis provided by the pivot 19. To absorb shock, each of the yokes 20 is provided with sets of spring seats 22 and 23, and confined between the arms 17 and 18 and the seats 22 and 23 are sets of coil springs as indicated at 24 and 25, the latter being of the expansion type, and are disposed to operate in opposition to each other so that swinging movement of each caster wheel about its pivot 19 from a normal position will be resiliently opposed by the action of said springs. In the event of road unevenness, it will be observed that the beam 12 may fulcrum about the pivot pin 10, allowing one caster wheel to be lowered and the other elevated without substantially affecting the operating positions of the bolster 7.

The forward ends of the draft bars 5 are provided with rigid, semispherical socket extensions 26, which extensions are adapted to be detachably disposed on ball members 27, which are carried by brackets 28, the latter being united by means of U-bolts 29 with the axle construction 1.

To facilitate the connection or disconnection of the extensions 26 with the members 27, each of the extensions 26 is provided with a tubular guide 30 for the slidable reception of a hollow plug 31, one end of which is finished to fit the spherical surface of the ball member 27. A compression type coil spring 32 is disposed within the plug and has one end engaged with a pin 33 extending transversely of the plug and the other end in engagement with a cap 34 employed to close the outer end of the guide 30. The force of the spring serves to yieldably hold the plug in engagement with the ball 27 and prevent the undesired release thereof from the member 26.

The pin also serves to connect the inner ends of a pair of links 35 to the plug, the outer ends thereof projecting through the cap and being connected with the intermediate portion of a lever 36 pivoted at one end to the body of the member 26. The other end of the lever is connected by a rod 37 with a manually operated actuating lever 38 mounted for swinging movement on one of the draft bars 5. When the lever is moved rearwardly, tension will be applied to the rod and transmitted thereby to the lever 36 mounted on the member 26 causing this lever to swing away from the member 26 and move the plug in opposition to the spring at which time the ball 27 will be released to permit the extension 26 to be removed and the truck uncoupled from the motor vehicle.

When it is desired to again connect the truck to the vehicle, the members 26 may be placed over the balls 27 and the levers 38 swung rearwardly to move the plugs in the members 26 whereby the sockets will be increased in size sufficiently to permit the balls 27 to be positioned therein. After the levers 38 are released, the plugs will return to their normal positions to prevent the release of the balls.

In view of the foregoing, it will be seen that the present invention provides a draft truck for automobile drawn trailers by which an improved support is provided for the normally unwheeled forward end of such trailers and wherein road unevenness or roughness is absorbed and compensation made so that side strains or lateral twisting movements between the joined vehicles do not affect the coupling. The truck may be quickly and securely connected with both the automotive vehicle and the trailer. Again, due to the construction of the truck frame and its working positions, the trailer vehicle may be backed or moved rearwardly by the automotive vehicle to facilitate parking or turning operations.

What is claimed is:

1. A trailer truck comprising a frame section having horizontally spaced forward ends, means for detachably coupling said forward ends to a motor vehicle to provide for vertical swinging movement of said frame section, a horizontally disposed pivot member supported at the rear portion of said frame with the longitudinal axis thereof in the same vertical plane as the longitudinal axis of said frame, a beam member supported on said pivot for rocking movement in a vertical plane extending transversely of said frame, caster wheels disposed at the ends of said beam member, and a coupling equipped load-support rigidly mounted on said frame over said pivot member.

2. The combination with a motor vehicle having a rear axle, bracket means spaced longitudinally of said axle and rigidly secured thereto, coupling sections carried by said brackets, a frame having laterally spaced forward ends, complemental coupling sections carried by said forward ends for cooperation with the sections on said brackets to connect said frame to said vehicle for vertical swinging movement, a pivot member disposed in a horizontal longitudinally extending position at the rear of said frame, said pivot being disposed centrally relative to said forward ends, a transversely extending beam mounted for rocking movement on said pivot, caster wheels supporting the outer ends of said beam, and a coupling equipped load-supporting bracket rigidly mounted on said frame adjacent to the central portion of said beam.

LEWIS W. WHITMER.